(12) United States Patent
Shibata et al.

(10) Patent No.: US 12,035,212 B2
(45) Date of Patent: Jul. 9, 2024

(54) WIRELESS COMMUNICATION DEVICE AND CONTROL METHOD FOR WIRELESS COMMUNICATION DEVICE

(71) Applicant: Hitachi, Ltd., Tokyo (JP)

(72) Inventors: Takeshi Shibata, Tokyo (JP); Nodoka Mimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 248 days.

(21) Appl. No.: 17/746,428

(22) Filed: May 17, 2022

(65) Prior Publication Data

US 2022/0394441 A1 Dec. 8, 2022

(30) Foreign Application Priority Data

Jun. 7, 2021 (JP) .................. 2021-095369

(51) Int. Cl.
*H04W 4/50* (2018.01)
*H04W 24/02* (2009.01)
*H04W 88/08* (2009.01)
*H04W 88/18* (2009.01)

(52) U.S. Cl.
CPC ............ *H04W 4/50* (2018.02); *H04W 24/02* (2013.01); *H04W 88/08* (2013.01); *H04W 88/18* (2013.01)

(58) Field of Classification Search
CPC ....... H04W 4/50; H04W 24/02; H04W 88/08; H04W 88/18; H04W 24/04
See application file for complete search history.

(56) References Cited

U.S. PATENT DOCUMENTS 11,108,629 B1 * 8/2021 Cahyadi .............. G06F 9/45558
2015/0244617 A1 * 8/2015 Nakil .................. H04L 41/0895
709/224

FOREIGN PATENT DOCUMENTS

JP 2004-187162 A 7/2004

* cited by examiner

*Primary Examiner* — Rafael Perez-Gutierrez
*Assistant Examiner* — Frank E Donado
(74) *Attorney, Agent, or Firm* — Volpe Koenig

(57) ABSTRACT

A wireless communication device including a network device, a wireless base station, and a server device includes: a plurality of surfaces that is a plurality of logical network sections; and a control device connected to the network device. The network device has: a plurality of first NW-IFs connected to the server device; and a second NW-IF connected to at least one of a network and wireless base station and connected to any one of the plurality of first NW-IFs. The server device has: a plurality of applications; a plurality of network settings; and a plurality of SV-IFs connected to the plurality of first NW-IFs. Each of the plurality of surfaces includes an application, network setting, SV-IF, and first NW-IF. The control device selects a surface conforming to conditions, and causes the network device to execute surface switching for connecting the second NW-IF to the first NW-IF in the selected surface.

9 Claims, 12 Drawing Sheets

FIG. 4A

SURFACE INFORMATION TABLE FOR SURFACE CONSTRUCTION
400

| | DEVICE NAME | SERVER 1 | | | |
|---|---|---|---|---|---|
| 401 | DEVICE TYPE | SERVER | | | |
| 402 | SURFACE NAME | SURFACE 1-1 | SURFACE 1-2 | SURFACE 1-3 | ... |
| 403 | NetNS NAME | NetNS1 | NetNS2 | NetNS3 | ... |
| 404 | IF NAME | if1 | if2 | if3 | ... |
| 405 | IP ADDRESS | 192.168.1.1/24 | 192.168.1.1/24 | 192.168.1.1/24 | ... |
| 406 | ROUTING TABLE | GW=192.168.1.254 | GW=192.168.1.254 | GW=192.168.1.254 | ... |
| | NW SLICE | SLICE 1 | SLICE 2 | SLICE 3 | ... |
| 407 | QoS | 10Mbps Strict Priority (PRIORITY) | 1Gbps Fair Queue (EQUALIZATION) | Best Effort | ... |
| 408 | CONNECTION | NONE | TCP CONNECTION TO 192.168.1.2 | NONE | ... |
| 409 | SURFACE SWITCHING POINT | VLAN 10 IN SW 1 | | | ... |

FIG.4B

SURFACE INFORMATION TABLE FOR SURFACE CONSTRUCTION
400

| DEVICE NAME | SWITCH 2 | | | |
|---|---|---|---|---|
| DEVICE TYPE | SWITCH | | | |
| SURFACE NAME | SURFACE 1-1 | SURFACE 1-2 | SURFACE 1-3 | ... |
| VLAN NAME | VLAN1 | VLAN2 | VLAN3 | ... |
| IF NAME | if1, if4 | if2, if5 | if3, if6 | ... |
| NW SLICE | SLICE 1 | SLICE 2 | SLICE 3 | ... |
| QoS | 10Mbps Strict Priority (PRIORITY) | 1Gbps Fair Queue (EQUALIZATION) | Best Effort | ... |
| SURFACE SWITCHING POINT | VLAN 10 IN SW 1 | | | ... |

FIG.4C
SURFACE INFORMATION TABLE FOR SURFACE CONSTRUCTION
400

| | DEVICE NAME | SWITCH 3 | | | |
|---|---|---|---|---|---|
| 401 | DEVICE TYPE | SWITCH | | | |
| 422 | SURFACE NAME | SURFACE 1-1 | SURFACE 1-2 | SURFACE 1-3 | ... |
| 413 | VRF NAME | VRF1 | VRF2 | VRF3 | ... |
| 414 | IF NAME | if1, if4 | if2, if5 | if3, if6 | ... |
| 415 | IP ADDRESS | if1=192.168.1.3/24<br>if4=192.168.3.3/24 | if2=192.168.1.3/24<br>if5=192.168.3.3/24 | if3=192.168.1.3/24<br>if6=192.168.3.3/24 | ... |
| 406 | ROUTING TABLE | 192.168.1.0/24 if1<br>192.168.3.0/24 if4 | 192.168.1.0/24 if2<br>192.168.3.0/24 if5 | 192.168.1.0/24 if3<br>192.168.3.0/24 if6 | ... |
| | NW SLICE | SLICE 1 | SLICE 2 | SLICE 3 | ... |
| 407 | QoS | 10Mbps<br>Strict Priority<br>(PRIORITY) | 1Gbps<br>Fair Queue<br>(EQUALIZATION) | Best Effort | ... |
| 409 | SURFACE SWITCHING POINT | VLAN 10 IN SW 1 | | | ... |

FIG.5

SURFACE GROUP TABLE
500

| SURFACE GROUP NAME | THE NUMBER OF SURFACES | SURFACE LIST | SELECTION | NOTE |
|---|---|---|---|---|
| SURFACE Gr1 | 3 | SURFACE 1-1 SURFACE 1-2 | MANUAL | MANUFACTURING LINE 1 |
| SURFACE Gr2 | 2 | SURFACE 2-1 SURFACE 2-2... | AUTOMATIC | MANUFACTURING LINE 2 |
| ... | ... | ... | ... | ... |

SURFACE INFORMATION TABLE FOR SURFACE SWITCHING
600

| | | | | |
|---|---|---|---|---|
| 601 — SURFACE NAME | SURFACE 1-1 | SURFACE 1-2 | SURFACE 1-3 | ... |
| 602 — IF NAME | if1 | if2 | If3 | ... |
| 603 — SURFACE SWITCHING POINT | VLAN 10 IN SW 1 | VLAN 10 IN SW 1 | VLAN 10 IN SW 1 | ... |
| 604 — SURFACE STATE | SELECTED | UNSELECTED | UNSELECTED | ... |

FIG.7

SURFACE SELECTION TABLE
700

| | | | | |
|---|---|---|---|---|
| 701 — SURFACE NAME | SURFACE 1-1 | SURFACE 1-2 | SURFACE 1-3 | ... |
| 702 — DELAY | LESS THAN 100 MILLISECONDS | LESS THAN 10 SECONDS | NO LIMIT | ... |
| 703 — BANDWIDTH | 1KB/sec | 25MB/sec | NO LIMIT | ... |
| 704 — CONNECTION APP | MICROPHONE (POINT A) | CAMERA (POINT A) | DATA COLLECTION | ... |

SURFACE GROUP LIST 1010

| SURFACE GROUP NAME | THE NUMBER OF SURFACES | SELECTED SURFACE | SELECTION |
|---|---|---|---|
| SURFACE Gr1 | 3 | SURFACE 1-1 | MANUAL |
| SURFACE Gr2 | 2 | SURFACE 2-1 | AUTOMATIC |
| SURFACE Gr3 | 5 | SURFACE 3-3 | AUTOMATIC |

1011  1012  1013  1014

SURFACE LIST 1020

SURFACE GROUP NAME: [ SURFACE Gr1 ] 1025

| SURFACE NAME | OPERATION APPLICATION | SELECTED SURFACE |
|---|---|---|
| SURFACE 1-1 | APP1-1 | ● |
| SURFACE 1-2 | APP1-2 | ○ |
| SURFACE 1-3 | APP1-3 | ○ |

1021  1022  1023

SETTING ITEM 1030

SURFACE NAME: [ SURFACE 1-1 ] 1035

OPERATION APPLICATION: APP1-1

▼DETAILED SETTING

CONFIGURATION DEVICE:

| DEVICE NAME | DEVICE TYPE | OPERATION TYPE |
|---|---|---|
| SERVER 1 | SERVER | SURFACE CONFIGURATION |
| SWITCH 1 | SWITCH | SURFACE CONFIGURATION |
| SWITCH 2 | SWITCH | SURFACE SWITCHING |

1031  1032  1033

WIRELESS COMMUNICATION DEVICE AND CONTROL METHOD FOR WIRELESS COMMUNICATION DEVICE

INCORPORATION BY REFERENCE

This application claims priority based on Japanese patent application, No. 2021-095369 filed on Jun. 7, 2021, the entire contents of which are incorporated herein by reference.

BACKGROUND

The present invention generally relates to communication control.

5th generation (5G) has been known as an example of the wireless network standard. A 5G network is stable in comparison with a wireless local area network (WLAN). Therefore, it is conceivable that some companies are beginning to consider to introduce 5G networks to their companies (introduction of local 5G).

In addition, 5G is expected to perform low delay processing by arranging a computer device called multi-access edge computing (MEC) at an edge.

Thus, it is conceivable to arrange a local 5G device (a device into which local 5G is introduced) at an edge as the MEC. It is conceivable to arrange the local 5G device, for example, in a factory (or in a company having a factory).

In order to quickly switch a communication route in the local 5G device in the case where a failure occurs in a production line of a factory, it is conceivable to construct a redundant route in the local 5G device on the basis of the technology disclosed in, for example, JP-2004-187162-A.

SUMMARY

The route characteristics of the "redundant route" of a communication route are the same as those of the communication route. In the case where a failure occurs in a production line, the required route characteristics differ before and after the failure. Therefore, it is not always possible to quickly respond to the failure of the production line by preparing the redundant route. For example, a monitoring system of a production line of a factory collects small-size data (for example, measurement value data) from sensors of each facility, and collects large-size data (for example, video data of cameras around a facility) related to the facility in the case where an abnormality of the facility is detected. When the size of the data increases according to such a situation, a delay in communication and a deterioration in communication quality may occur. In addition, since processing performed according to a situation differs, it is conceivable to take time to change the processing.

Thus, even if the communication route is made redundant, such problems cannot be solved. In addition, such problems may also occur in wireless communication other than 5G (for example, long term evolution (LTE)), or in a case other than the case where the wireless communication device is arranged in a factory (or in a company having a factory). In addition, the switching of the communication route may be performed according to changes other than the failure of the production line, for example, changes in the situation of a cooperation system utilizing the local 5G device.

A wireless communication device as a device package including a network device, a wireless base station, and one or more devices connected to the network device includes: a plurality of surfaces that are a plurality of logical network sections; and a control device that is connected to the network device. The one or more devices include a server device that is one or more computers connected to the network device. The network device has: a plurality of first NW-IFs that are a plurality of interfaces connected to the server device; and a second NW-IF that is an interface connected to at least one of a network and the wireless base station and that is an interface connected to any one of the plurality of first NW-IFs. The server device has: a plurality of applications each of which inputs and outputs data; a plurality of network settings each of which is the basis for data transfer; and a plurality of SV-IFs that are a plurality of interfaces connected to the plurality of first NW-IFs. Each of the plurality of surfaces includes an application, a network setting, an SV-IF, and a first NW-IF that are not included in a surface other than the surface. The control device has, for each of the plurality of surfaces, surface management information including information related to the surface. The control device selects a surface conforming to conditions from the plurality of surfaces on the basis of the surface management information, and causes the network device to execute surface switching for connecting the second NW-IF to the first NW-IF in the selected surface.

According to the present invention, it is possible to quickly change processing according to the situation of communication.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A shows a configuration example of a surface information table for surface construction;

FIG. 4B shows a configuration example of the surface information table for surface construction;

FIG. 4C shows a configuration example of the surface information table for surface construction;

FIG. 5 shows a configuration example of a surface group table;

FIG. 6 shows a configuration example of a surface information table for surface switching;

FIG. 7 shows a configuration example of a surface selection table;

FIG. 10 shows a configuration example of an operation user interface that is an example of a user interface provided by an operation interface (IF) unit;

DESCRIPTION OF THE EMBODIMENTS

Figure 1:
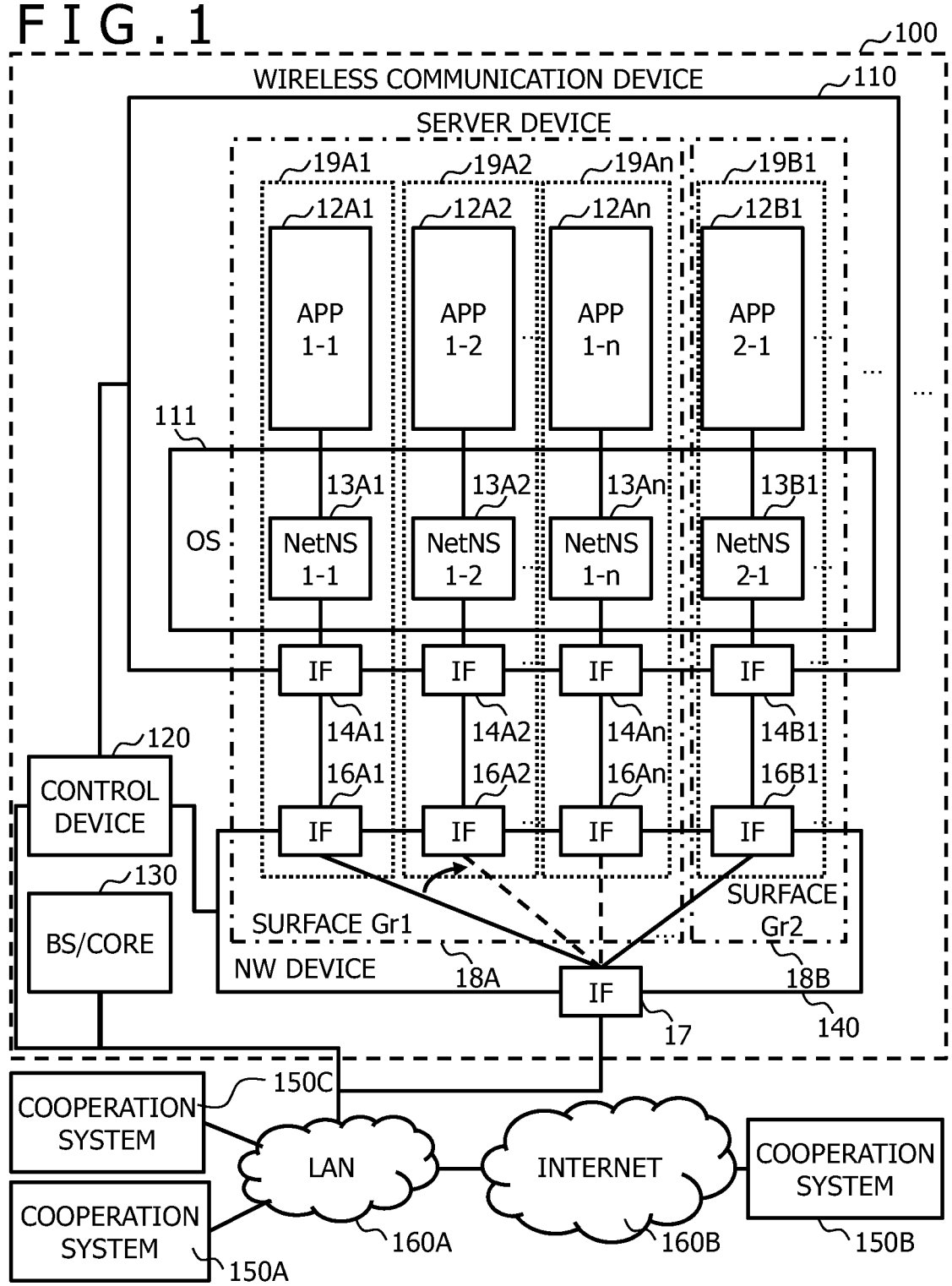
FIG. 1 shows a configuration example of an entire system according to a first embodiment.

In the following description, the "interface device" may be one or more communication interface devices. The one or more communication interface devices may be one or more communication interface devices of the same kind (for example, one or more network interface cards (NICs)) or two or more communication interface devices of different kinds (for example, the NICs and host bus adapters (HBAs)).

In addition, in the following description, the "memory" is one or more memory devices that are examples of one or more storage devices, and may typically be a main storage device. At least one memory device in the memory may be a volatile memory device or a non-volatile memory device.

In addition, in the following description, the "persistent storage device" may be one or more persistent storage devices that are examples of one or more storage devices. The persistent storage device may typically be a non-volatile storage device (for example, an auxiliary storage device), and may specifically be, for example, a hard disk drive (HDD), a solid state drive (SSD), a non-volatile memory express (NVMe) drive, or a storage class memory (SCM).

In addition, in the following description, the "storage device" may be at least a memory of a memory and a permanent storage device.

In addition, in the following description, the "processor" may be one or more processor devices. At least one processor device may typically be a microprocessor device such as a central processing unit (CPU), or may be a processor device of another kind such as a graphics processing unit (GPU). At least one processor device may be single-core or multi-core. At least one processor device may be a processor core. At least one processor device may be a processor device in a broad sense such as a circuit (for example, a field-programmable gate array (FPGA), a complex programmable logic device (CPLD), or an application specific integrated circuit (ASIC)) that is an aggregation of gate arrays in a hardware description language that performs some or all of processing.

Further, in the following description, although information from which an output is obtained with respect to an input is described by an expression such as an "xxx table" in some cases, the information may be data of any structure (for example, may be structured data or unstructured data), a neural network for generating an output with respect to an input, or a learning model typified by a genetic algorithm or a random forest. Thus, the "xxx table" can be referred to as "xxx information." In addition, in the following description, the configuration of each table is an example, and one table may be divided into two or more tables, or all or some of two or more tables may be one table.

In addition, in the following description, a function is described by an expression of a "yyy unit" in some cases, but the function may be realized by one or more computer programs executed by a processor, by one or more hardware circuits (for example, the FPGAs or the ASICs), or by a combination thereof. In the case where the function is realized by the programs executed by the processor, the function may be at least a part of the processor because prescribed processing is performed by appropriately using a storage device and/or an interface device. The processing described using the function as a subject may be processing performed by a processor or a device having the processor. The programs may be installed from a program source. The program source may be, for example, a computer-readable recording medium (for example, a non-transitory recording medium) or a program distribution computer that includes a non-transitory storage device. The description of each function is an example, and a plurality of functions may be combined into one function, or one function may be divided into a plurality of functions.

In addition, in the following description, in the case where elements of the same kind are described without distinguishing them from each other, a common code among reference codes is used, and in the case where elements of the same kind are distinguished from each other, reference codes are used in some cases.

Hereinafter, some embodiments will be described. It should be noted that in the following description, a wireless communication device 100 is a device (device package) into which local 5G is introduced, but the present invention is not limited to such a device.

First Embodiment

FIG. 1 shows a configuration example of an entire system according to a first embodiment.

The wireless communication device 100 is provided to, for example, a company and a municipality. The wireless communication device 100 includes a network device (hereinafter, an NW device) 140, a wireless base station/wireless core device 130 (a next generation node B (gNB) and a 5th generation core network (5GC)), a server device 110 (an example of one of one or more devices connected to the NW device 140) connected to the NW device 140, and a control device 120 connected to the NW device 140. The server device 110 is one or more computers, and corresponds to an MEC or the like in a 5G network. The wireless base station/wireless core device 130 may be an example of a cooperation system 150 (for example, the device 130 may be arranged outside the wireless communication device 100).

The wireless base station 130 performs wireless communication with a wireless communication apparatus not shown. The wireless communication apparatus may be a robot operating in a factory, an unmanned carrier vehicle, a sensor, a tablet-type personal computer (PC), a smartphone, or the like. The wireless communication apparatus communicates with the server device 110 in the wireless communication device 100 via the wireless base station 130, and exchanges data such as text, audio, and video.

The NW device 140 is, for example, a network switch device. The NW device 140 has a plurality of first NW-IFs 16 and one (or more) second NW-IF 17. The first NW-IF 16 is an interface connected to the server device 110. The second NW-IF is an interface connected to at least one of a LAN 160A and the wireless base station 130. Cooperation systems 150A and 150C are connected to the LAN 160A. In addition, the LAN 160A is connected to the Internet 160B, and a cooperation system 150B is connected to the Internet 160B. The cooperation system 150A may be, for example, a system or a sensor provided in a site such as a factory. The cooperation system 150B may be, for example, a cloud computing system. The cooperation system 150C may be a computer as a console of the control device 120. The LAN 160A and the Internet 160B are examples of networks. In addition, each of the NW-IFs 16 and 17 may be a physical communication interface device or a logical communication interface device. In addition, the control device 120 includes a user interface (UI) device as a console, and display of information to the user and reception of information input from the user may be performed by the UI device of the control device 120 in place of or in addition to the cooperation system 150C.

The server device 110 has an operating system (OS) 111, a plurality of applications (APPs) 12 operating on the OS 111 and each performing input/output of data, and a plurality of SV-IFs 14. The OS 111 is, for example, Linux (registered trademark), and has a plurality of network namespaces (NetNSs) 13. The NetNS 13 is an example of network settings on which data transfer is based. The SV-IF 14 is an interface connected to the first NW-IF 16. The SV-IF 14 may be a physical communication interface device or a logical communication interface device. The wireless communication apparatus communicates with the cooperation system 150A or 150B via the SV-IF 14.

A plurality of surfaces 19 are constructed in the wireless communication device 100. The surface 19 is a logical network section. Each of the plurality of surfaces 19 includes an APP 12, a NetNS 13, an SV-IF 14, and a first NW-IF 16 that are not included in a surface other than the surface 19. For example, elements of a surface 19A1 are an APP 12A1, a NetNS 13A1, an SV-IF 14A1, and a first NW-IF 16A1. For each surface 19, no elements in the surface 19 are used as elements of a surface other than the surface 19, and therefore the surface 19 is a section independent of any surface other than the surface 19. It should be noted that in at least one surface 19, a route connected to the APP 12 in the surface 19 may be redundant. In addition, the plurality of surfaces 19 may include two or more surfaces 19 having the same APP 12 but different network characteristics (for example, characteristics based on at least one of a delay and a bandwidth). The APP 12 need not be included in a particular NetNS 13, and a region up to a virtual interface configured on the OS may be included in the NetNS 13. The APP 12 is linked with another virtual interface, and the connection between the virtual interface of the NetNS 13 and the virtual interface of the APP 12 may be switched in surface switching.

The control device 120 selects a surface 19 (for example, a surface 19A2) conforming to conditions from the plurality of surfaces 19, and causes the NW device 140 to execute surface switching for connecting the second NW-IF 17 to a first NW-IF 16A2 in the selected surface 19A2. As an example, the switching method is realized in such a manner that a virtual LAN (VLAN) configured using the IF 17 that is a contact point with the outside of the surface 19 and the first NW-IF 16 belonging to a certain surface is replaced with a VLAN configured using the same IF 17 and another NW-IF 16. It should be noted that even if the APP 12 is the same, the surface switching can be performed if the guaranteed delay or bandwidth is small. After causing the NW device 140 to execute the surface switching, the control device 120 may confirm whether or not the surface switching has been performed as instructed by inquiring of the NW device 140. In addition, instead of being provided in the wireless communication device 100 (namely, locally provided), the control device 120 may be provided outside the wireless communication device 100 (for example, a site of a communication carrier).

In each surface 19, connections are preliminarily established between the elements in the surface 19. Specifically, a connection (for example, a VLAN) is preliminarily established between the first NW-IF 16A and the SV-IF 14, and the SV-IF 14 and the APP 12 are preliminarily associated with the NetNS 13 (the SV-IF 14 is assigned to the NetNS 13 and the APP 12 is executed by designating the NetNS 13). Further, the APP 12 differs depending on the surface 19. Therefore, the switching of the surface 19 means integrally switching the APP 12 and the network in the wireless communication device 100. Accordingly, a processing change according to a situation can be quickly performed. Specifically, for example, in the case where a situation (for example, data to be processed via the second NW-IF 17, a transmission source of data, or required network characteristics (characteristics based on at least one of a communication delay and a communication bandwidth)) is changed due to an occurrence of an abnormality in a facility in a site such as a factory and the surface 19A1 (the surface 19A1 including the first NW-IF 16 connected to the second NW-IF 17) in a selected state becomes unsuitable for the changed situation, the surface 19A2 suitable for the changed situation is preliminarily prepared, so that the processing and communication suitable for the changed situation can be maintained by switching the connection destination of the second NW-IF 17 from the surface 19A1 to the surface 19A2. In other words, it is not necessary to run a new application suitable for the changed situation or establish a connection suitable for the changed situation every time the situation is changed. Therefore, it is possible to quickly respond to a situation change caused by an abnormality or others. In addition, as an example of the reason for a change in required network characteristics, there is a request to transmit video data necessary for investigating the cause of the abnormality although numerical data from a sensor has been merely collected so far. Since it becomes possible to quickly grasp the cause of the abnormality or to execute the processing necessary for coping with the abnormality, it can be expected to quickly grasp the cause or cope with the abnormality.

The same Internet protocol (IP) address may be assigned to the plurality of SV-IFs 14. Since the plurality of NetNSs 13 are different from each other, it is possible to construct the plurality of different surfaces 19 even if the same IP address is assigned to the plurality of SV-IFs 14. In addition, since the IP addresses of the plurality of SV-IFs 14 are the same, there is no need for the mating device (for example, the wireless communication apparatus or the cooperation system 150A or 150B) that is a device communicating with the server device 110 to perform IP address switching (switching of the IP address designated in communication) accompanied by the surface switching.

In addition, the plurality of surfaces 19 may configure two or more surface groups 18. Each of the two or more surface groups 18 includes two or more (or one) surfaces 19. The control device 120 selects one surface for each surface group 18 and causes the NW device 140 to execute the surface switching for connecting the first NW-IF 16 of the surface to the second NW-IF 17. By setting two or more surfaces 19 having a common category (for example, a data type and network characteristics) to the same surface group 18, the processing can be quickly changed according to the situation in surface group units (category units). In the embodiment, the first NW-IF 16 of any surface 19 in each surface group 18 is connected to one second NW-IF 17, but the second NW-IF 17 is prepared for each surface group 18, and it may be maintained that one first NW-IF 16 is connected to one second NW-IF 17.

Figure 2:
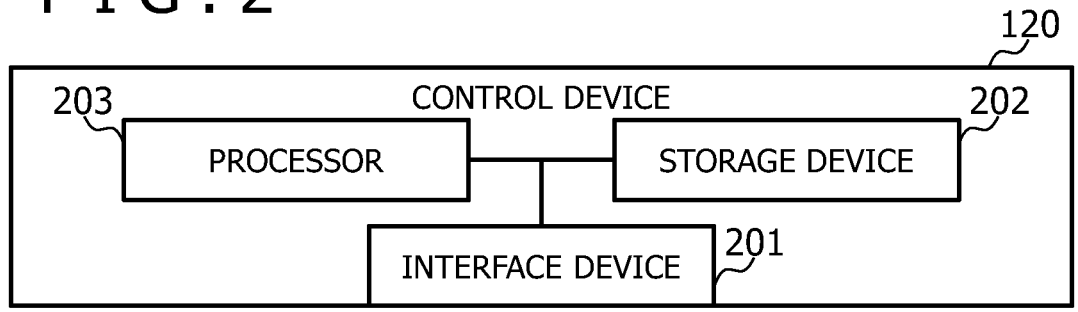
FIG. 2 shows a hardware configuration example of a control device.

FIG. 2 shows a hardware configuration example of the control device 120.

The control device 120 is, for example, a computer, and includes an interface device 201, a storage device 202, and a processor 203 connected thereto.

To the interface device 201, the server device 110 (for example, an SV-IF (an interface device of the server device 110) different from the SV-IF 14) is connected. In addition, to the interface device 201, an NW device 140 (for example, an NW-IF (an interface device of the NW device 140) different from the NW-IFs 16 and 17) is connected.

The storage device 202 stores a surface database (DB) including surface management information. In addition, the storage device 202 stores a computer program executed by the processor 203. The processor 203 reads and executes the computer program from the storage device 202.

Figure 3:
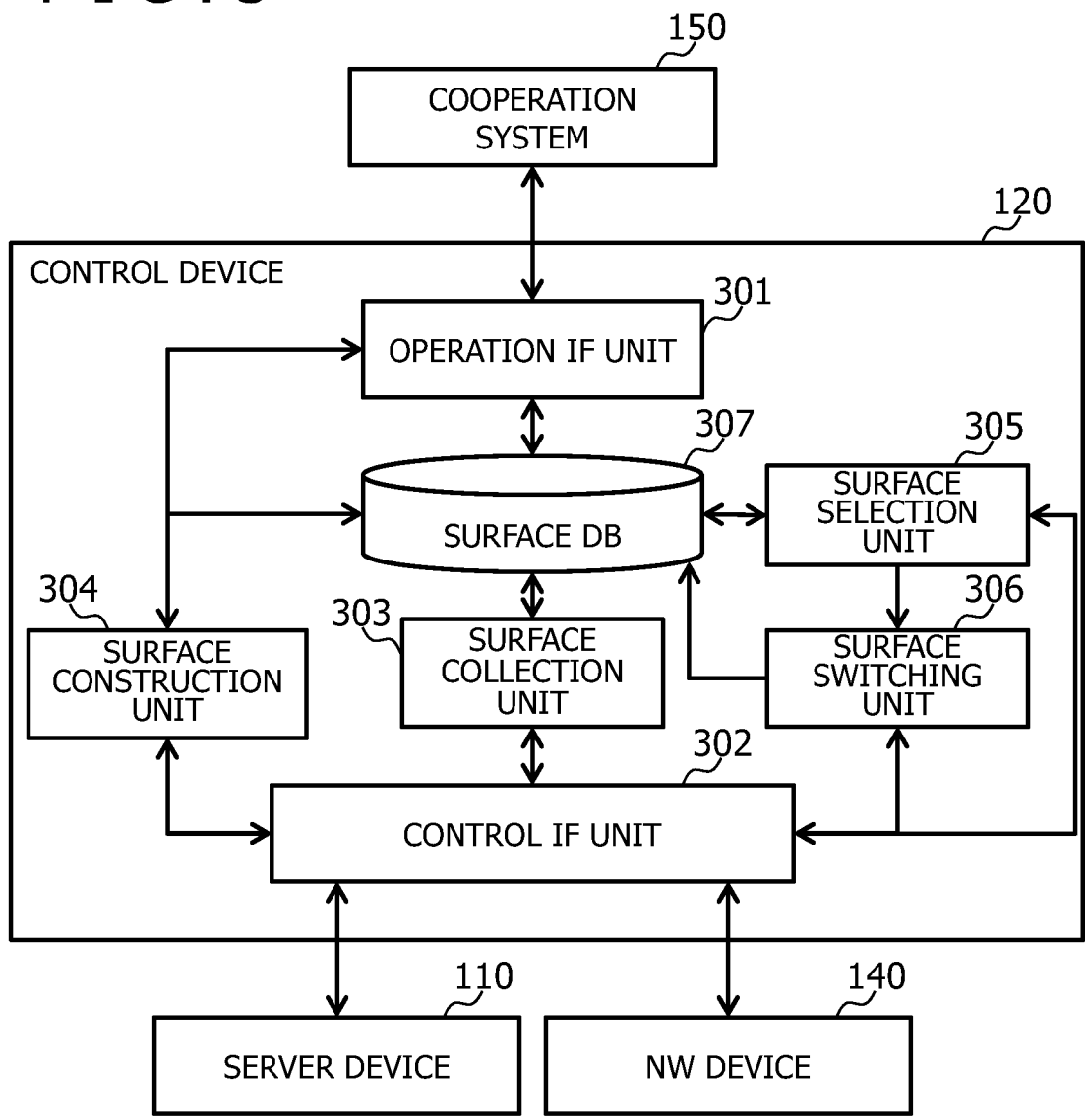
FIG. 3 shows a functional configuration example of the control device.

FIG. 3 shows a functional configuration example of the control device 120.

When the processor 203 of the control device 120 executes the computer program, functions such as an operation IF unit 301, a control IF unit 302, a surface collection unit 303, a surface construction unit 304, a surface selection unit 305, and a surface switching unit 306 are realized. In addition, a surface DB 307 is stored in the storage device 202.

The operation IF unit 301 provides an IF (for example, a UI or an application programming interface (API)) to the cooperation system 150. Communication with the cooperation system 150 is performed via the operation IF unit 301.

The control IF unit 302 provides an IF (for example, a UI or an API) to the server device 110 or the NW device 140. Communication with the server device 110 or the NW device 140 is performed via the control IF unit 302.

The surface collection unit 303 collects surface information that is information related to the elements of the surface 19 from the server device 110 and the NW device 140, and stores the collected surface information in the surface DB 307.

The surface construction unit 304 receives a surface construction request from the cooperation system 150 via the operation IF unit 301, and constructs the surface 19 in the server device 110 and the NW device 140 via the control IF unit 302 on the basis of the surface DB 307, according to the request.

The surface selection unit 305 selects a surface 19 according to the situation detected via the control IF unit 302 on the basis of the surface DB 30. The selection of the surface 19 is performed on a surface group basis.

The surface switching unit 306 causes the NW device 140 to perform surface switching for connecting the first NW-IF 16 of the surface 19 selected by the surface selection unit 305 to the second NW-IF 17. The surface switching is performed on a surface group basis.

The surface DB 307 stores the surface management information and the collected surface information. The surface management information includes, for example, tables shown in FIG. 4 to FIG. 8.

FIG. 4A to FIG. 4C show a configuration example of a surface information table for surface construction 400.

The surface information collected and stored in the surface DB 307 may be provided to the cooperation system 150 by, for example, the operation IF unit 301. The cooperation system 150 decides elements of the surface to be constructed on the basis of the provided surface information, and the cooperation system 150 may transmit a surface construction request designating the decided elements to the control device 120. A surface is constructed by the surface construction unit 304 of the control device 120 according to the surface construction request, and information of the constructed surface is registered in the surface information table for surface construction 400.

The surface information table for surface construction 400 exemplified in FIG. 4A is taken as an example. The surface information table for surface construction 400 has columns for each constructed surface. Each column holds information related to a surface corresponding to the column, for example, a surface name 401, a NetNS name 402, an IF name 403, an IP address 404, a routing table 405, an NW slice name 406, a QoS 407, a connection 408, and a surface switching point 409. One surface is taken as an example (a "target surface" in the description of FIG. 4A).

The surface name 401 represents the name of the target surface. In the embodiment, the name of the surface is configured as "surface group number-surface number." Thus, it is possible to specify a surface group to which the target surface belongs from the name of the target surface.

The NetNS name 402 represents the name of the NetNS included in the target surface. The IF name 403 represents the name of the SV-IF 14 included in the target surface (in the case where other switches and the like such as FIG. 12 to be described later are included in the surface configuration, a specific interface of a specific device may be represented). The IP address 404 represents the IP address assigned to the SV-IF 14 included in the target surface.

The routing table 405 represents the routing table of the target surface, and FIG. 4A represents the IP address of a default gateway as an example. It should be noted that the routing table may have a plurality of entries without limiting to one entry such as the default gateway. For a certain destination, a surface to be changed to pass through another route is conceivable, and a routing table corresponding to such a surface may be provided. The routing table may be referred to in the case where a route to a certain destination is changed by changing the APP 12. By changing the route, processing in the middle of the route and network characteristics can be changed. According to the example shown in FIG. 4A, setting items of a network necessary for connecting certain two points are listed.

The NW slice name 406 corresponds to the name of the QoS associated with the target surface. The QoS 407 represents the QoS associated with the target surface. Thus, for example, in the case where the QoSs of a surface 1-1 and a surface 1-2 are the same, the NW slice names of the surface 1-1 and the surface 1-2 are the same.

The connection 408 represents the presence or absence of a connection with a device (for example, the cooperation system or other devices) other than the NW device 140 and the server device 110. In the case where there is such a connection, the connection 408 represents the content of the connection (for example, the IP address of the connected device and the protocol of the connection). For example, in the case where an APP operating in a certain surface is TCP-connected to a certain database on the cooperation system and integrally operates, the processing and time required for the TCP connection after the surface switching are not necessary by maintaining the state of the TCP connection to the database in advance in the surface.

The surface switching point 409 represents the switching point at which the target surface group (Gr) is switched. For example, the surface switching point 409 represents that the selection surface is decided by selecting an NW-IF 16 in a specific VLAN of a specific NW device.

It should be noted that in FIG. 4A to FIG. 4C, Strict Priority (SP) and Fair Queue (FQ) mean a processing method when communication collides in a scheduler in the device. According to the SP, since the transfer is preferentially performed, the waiting time becomes short and the delay becomes low. According to the FQ, since the transfer is performed equally with other communication, a certain degree of waiting occurs.

In addition, according to FIG. 4B, in the case where the NW device 140 is a device to which layer 2 (L2) (data link layer in OSI Reference model) is applied, the surface information table for surface construction 400 of the NW device 140 has the above-described information 401, 406, 407, and 409, a VLAN name 412, and an IF name 413. The IF name 413 represents a pair (connection between the SV-IF 14 and the first NW-IF 16) of the name (for example, "if1," "if2," or "if3") of the SV-IF 14 and the name (for example, "if4," "if5," or "if6") of the first NW-IF 16. The VLAN name 412 represents the name of the VLAN connecting the SV-IF 14 and the first NW-IF 16 to each other. That is, the network is partitioned by not the NetNS but the VLAN, and information related to the IP addresses is not necessary.

In addition, according to FIG. 4C, in the case where the NW device 140 is a device to which layer 3 (L3) (network layer in OSI Reference model) is applied, the surface information table for surface construction 400 of the NW device 140 has the above-described information 401, 406, 407, 409, and 413, a function called virtual routing and forwarding (VRF) name 422, an IP address 414, and a routing table 415. By using a VRF, the IP space can be divided as similar to the NetNS. The VRF name 422 represents the name of the VRF. The IP address 414 represents each IP address of the SV-IF 14 and the first NW-IF 16. The routing table 415 represents the routing table of the target surface, and FIG. 4C represents each IP address of the SV-IF 14 and the first NW-IF 16 as an example.

FIG. 5 shows a configuration example of a surface group table 500.

In the surface construction request, a surface group to which the surface to be constructed belongs may be designated, or a surface group to which the constructed surface belongs may be automatically decided by the surface construction unit 304. The surface group table 500 has records for each surface group, and each record holds information such as a surface group name 501, the number of surfaces 502, a surface list 503, a selection 504, and a note 505. One surface group is taken as an example (a "target surface group" in the description of FIG. 5).

The surface group name 501 represents the name of the target surface group. The number of surfaces 502 represents the number of surfaces included in the target surface group. The surface list 503 is a list of the names of the surfaces included in the target surface group. The selection 504 represents whether the selection of a surface from the target surface group is made manually or automatically. The note 505 represents supplementary information about the target surface group, for example, what type of surface group the target surface group is.

One surface can be selected from each of N (N is a natural number) surface groups, and thus the N surfaces are simultaneously selected. As described above, one control device 120 can select and manage the plurality of surfaces. A network in each surface group does not compete with a network in another surface group. As supplementary information for distinguishing the surface groups from each other, for example, it is conceivable to use a specific user in the case of a multi-tenant, and it is conceivable to use a specific manufacturing line in the case of one factory. It should be noted that in the embodiment, a set of a plurality of surfaces that cannot coexist at the same time (a plurality of surfaces that cannot be selected at the same time) is defined as a surface group. For example, in the case where there are two or more surfaces that can coexist at the same time, each of the two or more surfaces exists in two or more different surface groups. A surface (for example, a combination of communication characteristics, a route, an application, and the like) is switched (selected) for each surface group.

FIG. 6 shows a configuration example of a surface information table for surface switching 600.

The surface information table for surface switching 600 has columns for each surface. The surface information table for surface construction 400 is a table constructed for the server device 110, whereas the surface information table for surface switching 600 is a table constructed for the NW device 140. Each column of the surface information table for surface switching 600 holds information related to a surface corresponding to the column, for example, information such as a surface name 601, an IF name 602, a surface switching point 603, and a surface state 604. One surface is taken as an example (a "target surface" in the description of FIG. 6).

The surface name 601 represents the name of the target surface. The IF name 602 represents the name of the NW-IF 16 included in the target surface. The surface switching point 603 represents the switching point at which the target surface group is switched as similar to FIG. 4A to FIG. 4C. The surface state 604 represents whether the target surface is in a selected state or an unselected state.

FIG. 7 shows a configuration example of a surface selection table 700.

The surface selection table 700 has columns for each surface. Each column holds information related to a surface corresponding to the column, for example, information such as a surface name 701, a delay 702, a bandwidth 703, and a connection APP 704. One surface is taken as an example (a "target surface" in the description of FIG. 7).

The surface name 701 represents the name of the target surface. The delay 702 represents the upper limit of the communication delay guaranteed by the target surface. The bandwidth 703 represents the bandwidth secured for the target surface. The connection APP 704 represents an application of the APP included in the target surface. An example of the APP 12 is an APP that handles audio from a microphone in a factory. In the case where a manufacturing line in a factory is employed as an example, a "microphone (point A)" means a microphone installed at a point "A" on a manufacturing line in a factory. In the embodiment, even if the same microphone is installed in a different location, the route through which data (traffic) input by the microphone flows is different, and thus another surface is required.

A surface is selected on the basis of the surface selection table 700. According to FIG. 7, the surface selection is, for example, as follows.

In the case where data communication that may be narrow in bandwidth but requires a low delay is performed or in the case where an APP capable of processing audio data is required, the surface 1-1 is selected.

In the case where data communication that does not require a low delay but requires a wide bandwidth is performed or in the case where an APP capable of processing video data is required, the surface 1-2 is selected.

In the case where there are no particular requirements for the delay and the bandwidth or in the case where data communication is performed for data collection, the surface 1-3 is selected.

It should be noted that the bandwidths exemplified in FIG. 7 corresponds to the numerical values in bps of the QoS exemplified in FIG. 4A to FIG. 4C. For example, 1 KB/sec is equal to 8 Kbps, 25 MB/sec is equal to 200 Mbps, and 10 Mbps and 1 Gbps are employed in FIG. 4A to FIG. 4C as numerical values that have a margin in consideration of delay control and are easy to understand in the standard.

Figure 8:
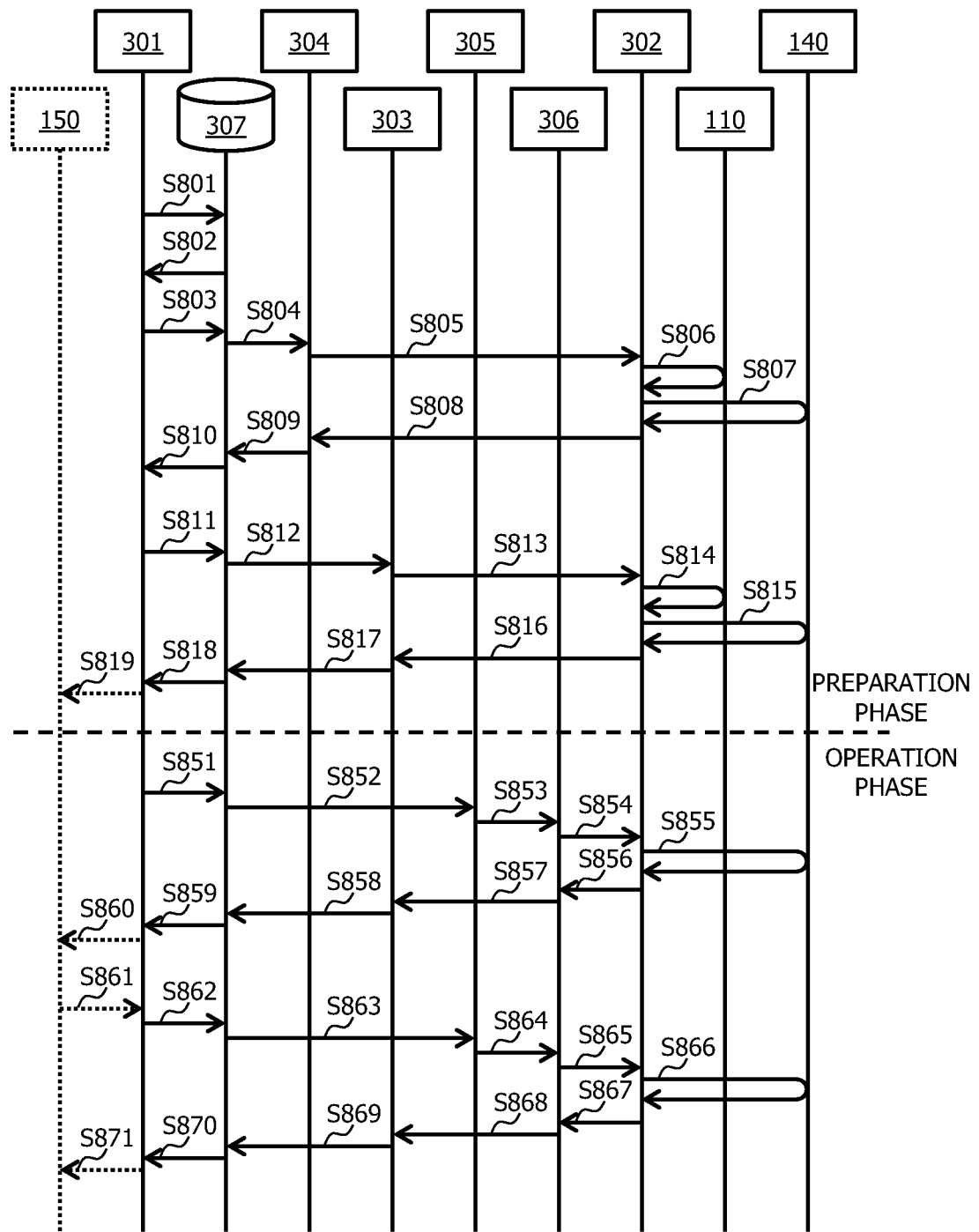
FIG. 8 shows an example of processing performed in the first embodiment.

FIG. 8 shows an example of processing performed in the embodiment.

The processing is roughly divided into a preparation phase and an operation phase.

<Preparation Phase>

Using a UI provided by the operation IF unit 301, the administrator of the surfaces creates surface information (information representing elements of the surface) having the items described in FIG. 4A to FIG. 4C and FIG. 6 as elements, stores the created surface information in the surface DB 307 (S801), and receives the result (S802).

The operation IF unit 301 refers to the surface information stored in the surface DB 307 to construct a surface (S803). The surface construction unit 304 acquires the surface information (for example, the surface information referenced and confirmed in S803) necessary for surface construction from the surface DB 307 (S804), and instructs the control IF unit 302 to construct on the basis of the surface information (S805). In response to the instruction, the control IF unit 302 constructs in the server device 110 a portion in the server device 110 of the surface according to the surface information (S806), and constructs a portion in the NW device 140 of the surface according to the surface information (S807). Specifically, in S806, for example, the control IF unit 302 creates the NetNS name 402 corresponding to each surface of the surface name 401 of FIG. 4A, assigns each interface of the IF name 403 to each NetNS name 402, and sets each IP address of the IP address 404 to each interface of the interface name 403. The control IF unit 302 sets each routing table of the routing table 405 and each NW slice name of the NW slice name 406 in each NetNS of the NetNS name 402, and sets each QoS setting of the QoS 407 to each interface of the interface name 403. In addition, in S807, the control IF unit 302 sets the interface of the IF name 602 of the surface which corresponds to the surface name 601 and whose surface state 604 is selected in FIG. 6 to the VLAN of the surface switching point 603, and removes the interface of the IF name 602 of the surface whose surface state 604 is unselected from the VLAN of the surface switching point 603. Accordingly, the NW-IF 16 connected to the SV-IF 14 belongs to and is connected to the same VLAN as the IF 17, and selection as a surface is established. The control IF unit 302 notifies the surface construction unit 304 of the result (S808), the surface construction unit 304 stores the result in the surface DB 307 (S809), and the operation IF unit 301 receives the result (S810). The result shows whether or not the processing of S806 and S807 has been normally completed.

The operation IF unit 301 refers to the surface information stored in the surface DB 307 to collect the surface information (S811). The collection unit 303 acquires information of the surface for which the surface information is to be collected from the surface DB 307 (S812), and instructs the control IF unit 302 to collect the surface information (S813). In response to the instruction, the control IF unit 302 collects and updates the information set to the server device 110 in the server device 110 (S814) and/or collects and updates the information set to the NW device 140 (S815). The information collected and updated in S814 is the information described in the tables 400 exemplified in FIG. 4A to FIG. 4C and registered in the DB 307 in S801. The information collected and updated in S815 is the information described in the table 600 exemplified in FIG. 6 and registered in the surface DB 307 in S801. The control IF unit 302 notifies the surface collection unit 303 of the result (S816), the surface collection unit 303 stores the result in the surface DB 307 (S817), and the operation IF unit 301 receives the result (S818). The result shows whether or not the processing of S814 and S815 has been normally completed and the collected information. The operation IF unit 301 may notify the cooperation system 150 (for example, 150C) of the result.

<Operation Phase>

The operation IF unit 301 receives, for example, a surface switching request by the operation of the administrator or from the cooperation system 150, and the surface selection unit 305 refers to the surface information stored in the surface DB 307 (S851). The surface selection unit 305 refers to the surface selection table 700 (S852), selects the surface name designated in the surface switching request or the surface identified by the connection APP if the surface is in an unselected state, and notifies the surface switching unit 306 of surface information for surface switching (information of the column corresponding to the surface in the table 600) of the selected surface (S853). The surface switching unit 306 instructs the control IF unit 302 to switch the surface to the selected surface (the surface identified from the surface information for surface switching) (S854). That is, the surface switching unit 306 instructs the interface of the IF name 602 to be set to the VLAN designated in the surface switching point 603. In response to the instruction, the control IF unit 302 causes the NW device 140 to execute surface switching for connecting the second NW-IF 17 to the first NW-IF 16 of the surface (S855). That is, the control IF unit 302 sets the first NW-IF 16 of the surface to the VLAN designated in the surface switching point 603 to which the second NW-IF 17 is connected, and removes the first NW-IFs 16 of other surfaces from the VLAN designated in the surface switching point 603. The control IF unit 302 notifies the surface switching unit 306 of the result (S856), and the surface switching unit 306 notifies the surface selection unit 305 of the result (S857). The surface selection unit 305 updates the surface information table for surface switching 600 of the surface DB 307 on the basis of the result (the state of the selected surface is set to a selected state, and the state of the surface that is in the selected before the selection is set to an unselected state) (S858), and the operation IF unit 301 receives the result (S859). The result shows whether or not the processing of S855 has been normally completed and the surface information of the selected surface. The operation IF unit 301 may notify the cooperation system 150 of the surface information of the selected surface (S860).

The operation IF unit 301 may receive, for example, a situation change notification from the cooperation system 150 (S861). That is, the control device 120 may detect a change in situation by the notification from the cooperation system 150. The detection of the situation change may be performed in such a manner that the control device 120 monitors the NW device 140. The situation change may be detected by identifying the data transmission source device after the change, identifying the data type (for example, video, audio, or text) after the change of the communication target, or identifying the requirements (for example, a delay and/or a bandwidth) after the change of the network characteristics. The operation IF unit 301 stores a log of the situation change in the surface DB 307 (S862). The surface selection unit 305 refers to the surface selection table 700 (S863), selects the surface (surface in the unselected state) having characteristics suitable for the situation after the change, and notifies the surface switching unit 306 of the information for surface switching of the selected surface (S864). The surface switching unit 306 instructs the control IF unit 302 to switch the surface to the selected surface (the surface identified from the surface information for surface switching) (S865). In response to the instruction, the control IF unit 302 causes the NW device 140 to execute surface switching for connecting the second NW-IF 17 to the first NW-IF 16 of the surface (S866). The control IF unit 302 notifies the surface switching unit 306 of the result (S867), and the surface switching unit 306 notifies the surface selection unit 305 of the result (S868). The surface selection unit 305 updates the surface information table for surface switching 600 of the surface DB 307 on the basis of the result (S869), and the operation IF unit 301 receives the result (S870). The operation IF unit 301 may notify the cooperation system 150 of the surface information of the selected surface (S861).

As described above, the control device 120 constructs the surface represented by the surface information in the preparation phase. Accordingly, the control device 120 can quickly perform surface switching according to a change in situation in the operation phase.

Figure 9:
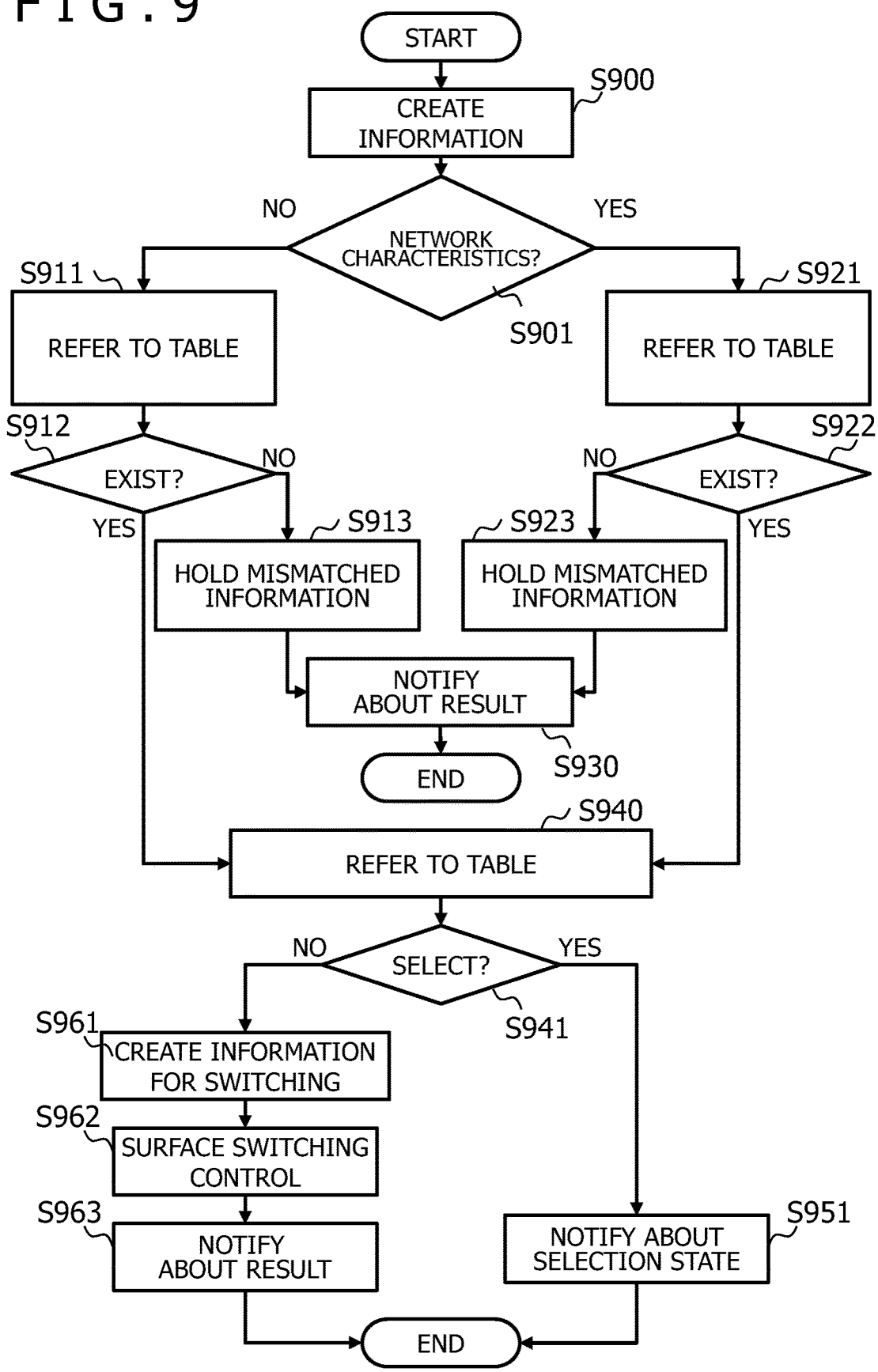
FIG. 9 shows an example of the details of S853 to S859 and S864 to S870 of FIG. 8.

FIG. 9 shows an example of the details of S853 to S859 and S864 to S870 of FIG. 8.

The surface selection unit 305 creates information for surface selection (S900). That is, the surface selection unit 305 matches the input related to the surface selection from the operation IF 301 with the surface information for surface switching stored in the surface DB 307, and creates information obtained by combining FIG. 7 and FIG. 6. The surface selection unit 305 determines whether or not a surface condition is a network characteristic (S901). This determination is made on the basis of the conditions designated in the request received via the operation IF unit 301 or the conditions according to the detected (designated) situation after the change. In the latter case, in the case where there is no change in the requirements of the network characteristics but the data transmission source device has changed or the data type has changed, the determination result in S901 is false because the APP of the data processing target needs to be changed.

In the case where the determination result in S901 is false (S901: NO), the surface selection unit 305 refers to the surface information table for surface construction 400 and the surface group table 500 (S911), and determines whether or not a surface (for example, a surface that conforms to the designated surface information or a surface containing the APP that satisfies the conditions) satisfying the conditions exists in the surface group satisfying the conditions (S912).

In the case where the determination result in S912 is false (S912: NO), the surface selection unit 305 stores the surface information that is not applicable or mismatched information that is information representing an APP (the designated surface information or an APP as a condition) in the surface DB 307 (S913), and notifies the operation IF unit 301 of the result including the mismatched information (S930). The operation IF unit 301 may display the result on, for example, the cooperation system 150.

In the case where the determination result in S912 is true (S912: YES), the surface selection unit 305 refers to the surface information table for surface switching 600 (S940), and determines whether or not the surface state 604 corresponding to the surface conforming to the conditions is "selected" (S941).

In the case where the determination result in S941 is true (S941: YES), the surface selection unit 305 notifies the operation IF unit 301 of the fact that the surface conforming to the conditions is in the selected state (already selected) (S951). The operation IF unit 301 may display the notification (the fact that the surface conforming to the conditions is in the selected state) on, for example, the cooperation system 150.

In the case where the determination result in S941 is false (S941: NO), the surface selection unit 305 selects the surface conforming to the conditions (the surface state 604 is set to "selected"), and the surface switching unit 306 creates information for switching to the surface (S961). That is, the surface switching unit 306 creates an instruction to set the interface of the IF name 602 of the surface to the VLAN designated in the surface switching point 603. The surface switching unit 306 transmits the created information for switching to the control IF unit 302, and the control IF unit 302 causes the NW device 140 to execute surface switching based on the information for switching, and receives the result of the surface switching (S962). The result of the surface switching is notified from the surface switching unit 306 to the operation IF unit 301 via the surface selection unit 305 (S963).

In the case where the determination result in S901 is true (S901: YES), the surface selection unit 305 refers to the surface information table for surface construction 400 and the surface group table 500 (S921), and determines whether or not a surface (for example, a surface having network characteristics that satisfies the situation after the change) satisfying the conditions exists in the surface group satisfying the conditions (S922).

In the case where the determination result in S922 is false (S922: NO), the surface selection unit 305 stores mismatched information that is information representing the network characteristics (for example, the requirements (for example, the range of each of the delay and the bandwidth) for the network characteristics that satisfy the situation after the change) that are not applicable in the surface DB 307 (S923), and notifies the operation IF unit 301 of the result including the mismatched information (S930). The operation IF unit 301 may display the result on, for example, the cooperation system 150.

In the case where the determination result in S922 is true (S912: YES), S940, S941, and S951 or S961 to S963 described above are performed.

As described above, the surface selection and the surface switching are performed according to the situation after the change detected by the control device 120. Accordingly, an APP and a network (communication route) according to the situation can be maintained.

In addition, the surface selection table 700 includes, for each of the plurality of surfaces, information representing the network characteristics (the characteristics based on at least one of the delay and bandwidth of the communication) that are guaranteed to the surface, and the conditions are requirements for network characteristics based on at least one of the delay and the bandwidth of the communication via the second NW-IF 17. Accordingly, even if the requirements of the network characteristics change, an appropriate APP and a network (communication route) can be maintained.

In addition, the surface information table for surface construction 400 includes, for each of the plurality of surfaces, information representing an application included in the surface. The condition is an application capable of processing data via the second NW-IF 17. Accordingly, even if the type of data to be processed changes, an appropriate APP and a network (communication route) can be maintained.

FIG. 10 shows a configuration example of an operation UI 1000 that is an example of a UI provided by the operation IF unit 301.

The operation UI 1000 is a UI used for inspecting and correcting information related to a surface group and inspecting and correcting information related to a surface. The operation UI 1000 displays a surface group list 1010, a surface list 1020, and a setting item 1030.

The surface group list 1010 is displayed on the basis of the surface group table 500, the surface information table for surface switching 600, and the surface selection table 700. The surface group list 1010 has a surface group name 1011, the number of surfaces 1012, a selected surface 1013, and a selection 1014 for each surface group. The surface group name 1011, the number of surfaces 1012, and the selection 1014 are information corresponding to the surface group name 501, the number of surfaces 502, and the selection 504, respectively. The selected surface 1013 is information representing the surface name of a surface whose surface state 604 is "selected" in the surface list 503.

The surface list 1020 is displayed on the basis of the surface group table 500 and the surface information table for surface switching 600. The surface group list 1010 has a section 1025 in which a surface group name is input and a list of surfaces corresponding to the surface group name input in the section 1025. The list has a surface name 1021, an operation application 1022, and a selected surface 1023 for each surface. The surface name 1021 is information based on the surface list 503. The operation application 1022 is information based on the connection APP 704. The selected surface 1023 is a tool (for example, a radio button) for surface selection.

The setting item 1030 is displayed on the basis of the surface information table for surface construction 400. The setting item 1030 has a section 1035 in which the surface name of the surface in the selected state in the surface list 1020 is displayed and a list of devices including the elements of the surface having the surface name displayed in the section 1035. The list has information such as a device name 1031, a device type 1032, and an operation type 1033 for each device. The device name 1031 represents the name of the device, the device type 1032 represents the type of the device, and the operation type 1033 represents whether the device becomes a configuration element of a surface or performs surface switching. The "server" means a server device, and the "switch" means an NW device.

The above is a description of the first embodiment. The surface 19 need not be included in the surface group, and the surface group need not be present.

Second Embodiment

A second embodiment will be described. In this case, differences from the first embodiment will be mainly described, and the description of common points with the first embodiment will be omitted or simplified.

Figure 11:
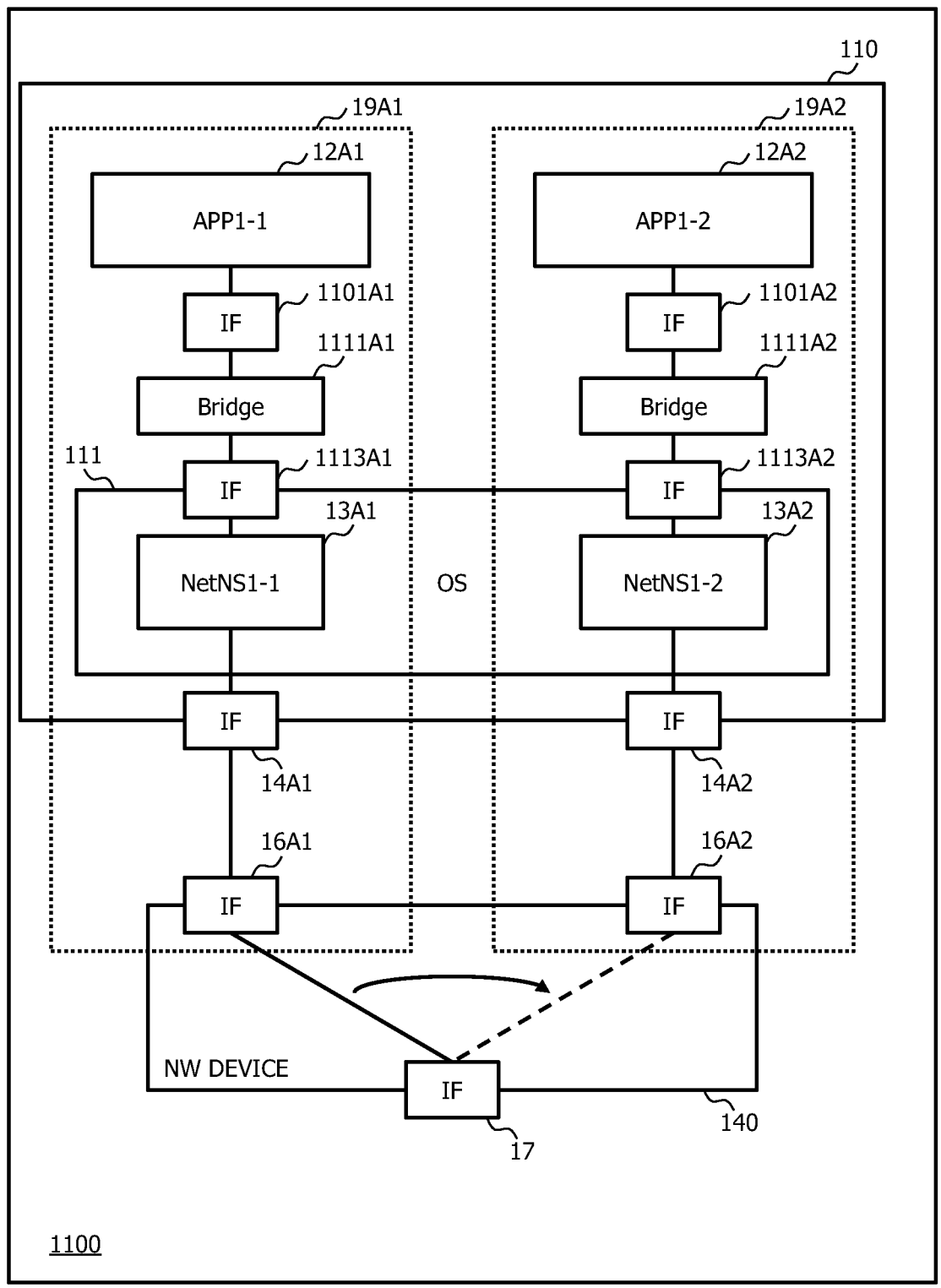
FIG. 11 shows a part of a configuration example of a wireless communication device according to a second embodiment.

FIG. 11 shows a part of a configuration example of a wireless communication device 1100 according to the second embodiment.

In the surface 19, an IF 1101, a bridge 1111, and an IF 1113 exist between the APP 12 and the NetNS 13 of the OS 111. Each of the IF 1101 and the IF 1113 is, for example, a virtual interface constructed on the OS. By using the bridge 1111, for example, the APP 12 to which, for example, an IP address and a VLAN are set according to the APP by an APP management system and the IF 1101 accompanying the APP are not directly operated from the outside of the APP management system, and it is possible to construct a surface by operating the settings between the bridge 1111 and the IF 14 that are not subject to the APP management system.

Third Embodiment

A third embodiment will be described. In this case, differences from the first and second embodiments will be mainly described, and the description of common points with the first and second embodiments will be omitted or simplified.

Figure 12:
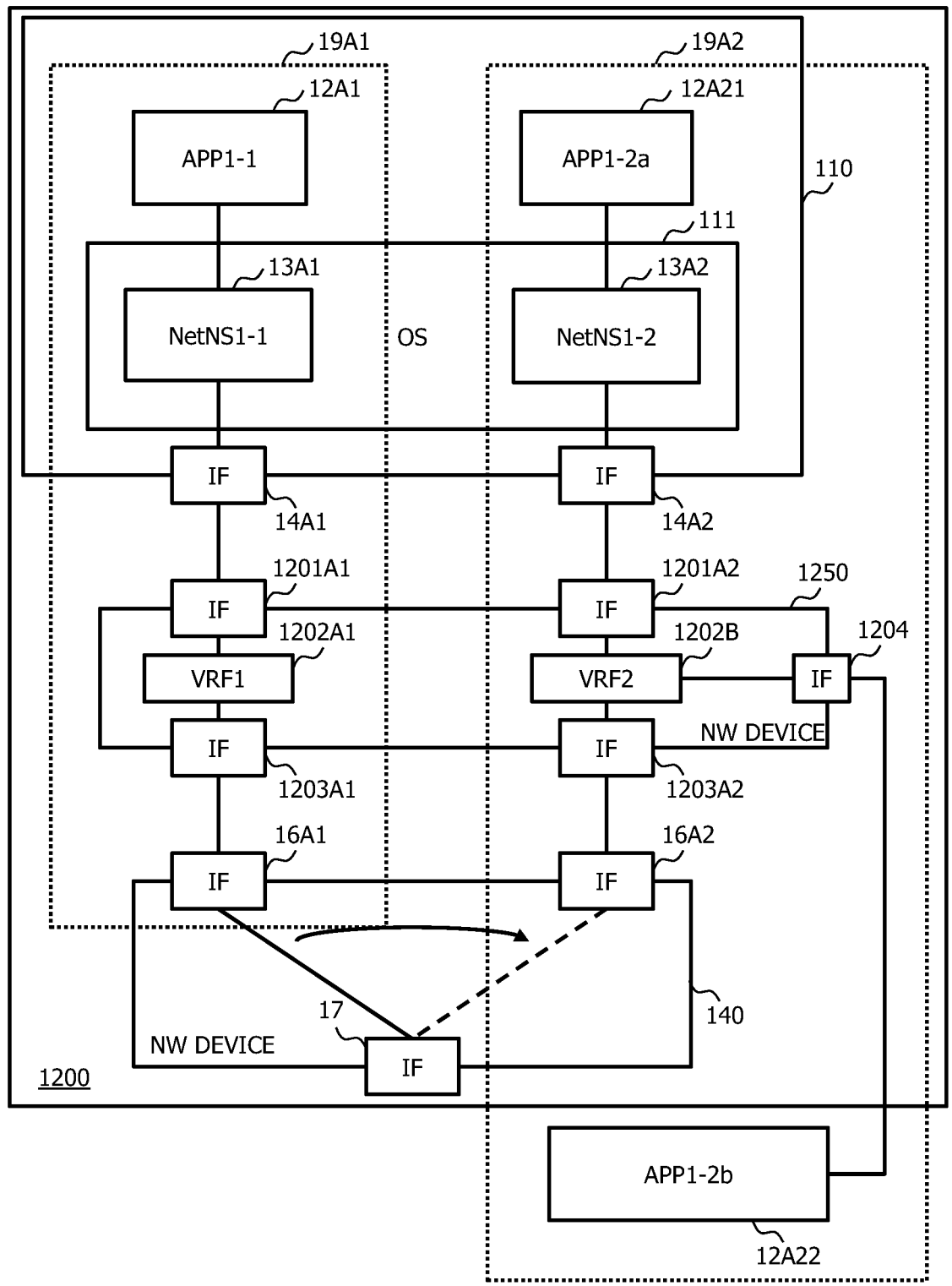
FIG. 12 shows a part of a configuration example of a wireless communication device according to a third embodiment.

FIG. 12 shows a part of a configuration example of a wireless communication device 1200 according to the third embodiment.

As shown in a surface 19A2, elements included in the surface 19 are not limited to those in the wireless communication device 1200. For example, another NW device 1250 may be interposed between the server device 110 and the NW device 140, an APP 12A22 in an external device (not shown) connected to an NW-IF 1204 of another NW device 1250 may be an element of the surface 19A2. The surface 19A2 may include an NW-IF 1201, an NW-IF 1203, and a VRF 1202 of another NW device 1250. Another NW device 1250 is an NW device (operation type "surface configuration") having elements of a surface to be constructed, and the NW device 140 is an NW device (operation type "surface switching") used for surface switching.

Although some embodiments have been described above, these are examples for describing the present invention and are not intended to limit the scope of the present invention to these embodiments only. The present invention can also be executed in various other forms. For example, in place of or in addition to the wireless communication device 100 as a device package, the control device may construct the plurality of surfaces described above and perform surface switching for a server device and a network device outside the wireless communication device 100.

What is claimed is:

1. A wireless communication device as a device package including a network device, a wireless base station, and one or more devices connected to the network device, the wireless communication device comprising:
 a plurality of surfaces that are a plurality of logical network sections; and
 a control device that is connected to the network device;
 wherein the one or more devices include a server device that is one or more computers connected to the network device;
 the network device has a plurality of first network interfaces (NW-IFs) that are a plurality of interfaces connected to the server device, and a second NW-IF that is an interface connected to at least one of a network and the wireless base station and that is an interface connected to any one of the plurality of first NW-IFs;
 wherein the server device has a plurality of applications, each of which inputs and outputs data, a plurality of network namespaces, each of which is a basis for data transfer, and a plurality of server interfaces (SV-IFs) that are a plurality of interfaces connected to respective ones of the plurality of first NW-IFs;
 each of the plurality of surfaces includes a set of elements that includes an application of the plurality of applications, a network namespace of the plurality of network namespaces, an SV-IF of the plurality of SV-IFs, and a first NW-IF of the plurality of first NW-IFs, wherein, for each of the plurality of surfaces, no elements in the set of elements for the surface are used as elements of a surface other than the surface;
the control device has, for each of the plurality of surfaces, surface management information including information related to the surface; and
the control device selects a surface conforming to conditions from the plurality of surfaces on a basis of the surface management information and a namespace of the plurality of network namespaces being included in the surface, the surface having different network characteristics than the other surfaces, and causes the network device to execute surface switching for connecting the second NW-IF to the first NW-IF of the plurality of first NW-IFs in the selected surface.

2. The wireless communication device according to claim 1, wherein
the conditions are conditions according to a situation after a change detected by the control device.

3. The wireless communication device according to claim 1, wherein
the surface management information includes, for each of the plurality of surfaces, information representing network characteristics guaranteed to the surface,
the network characteristics are characteristics based on at least one of a delay and a bandwidth of communication, and
the conditions are requirements for network characteristics based on at least one of the delay and the bandwidth of communication via the second NW-IF.

4. The wireless communication device according to claim 2, wherein
the surface management information includes, for each of the plurality of surfaces, information representing the use of the application included in the surface, and
the condition is the use of the application that can process data via the second NW-IF.

5. The wireless communication device according to claim 1, wherein
the plurality of surfaces configure two or more surface groups,
each of the two or more surface groups includes two or more surfaces, and
the control device selects one surface for each surface group, and causes the network device to execute surface switching for connecting the first NW-IF of the surface to the second NW-IF.

6. The wireless communication device according to claim 1, wherein
the control device constructs the plurality of surfaces.

7. The wireless communication device according to claim 1, wherein
IP addresses associated with the plurality of first NW-IFs are the same IP address.

8. A control method for a wireless communication device as a device package including a network device and one or more devices connected to the network device, the wireless communication device having a plurality of surfaces that are a plurality of logical network sections, the one or more devices including a server device that is one or more computers connected to the network device, the network device having a plurality of first NW-IFs that are a plurality of interfaces connected to the server device, and a second NW-IF that is an interface connected to at least one of a wireless base station and a network and that is an interface connected to any one of the plurality of first NW-IFs, the server device having a plurality of applications, each of which inputs and outputs data, a plurality of network namespaces, each of which is a basis for data transfer, and a plurality of server interfaces (SV-IFs) that are a plurality of interfaces connected to respective ones of the plurality of first NW-IFs, each of the plurality of surfaces including a set of elements that includes an application of the plurality of applications, a network namespace of the plurality of network namespaces, an SV-IF of the plurality of SV-IFs, and a first NW-IF of the plurality of first NW-IFs, wherein, for each of the plurality of surfaces, no elements in the set of elements for the surface are used as elements of a surface other than the surface, the control method comprising:
by one of the one or more computers, selecting a surface conforming to conditions from the plurality of surfaces on a basis of surface management information including, for each of the plurality of surfaces, information related to the surface, and a namespace of the plurality of network namespaces being included in the surface, the surface having different network characteristics than the other surfaces; and causing the network device to execute surface switching for connecting the second NW-IF to the first NW-IF of the plurality of first NW-IFs in the selected surface.

9. A non-transitory computer-readable medium comprising a computer program executed by a computer controlling a wireless communication device as a device package including a network device and one or more devices connected to the network device, the wireless communication device having a plurality of surfaces that are a plurality of logical network sections, the one or more devices including a server device that is one or more computers connected to the network device, the network device having a plurality of first NW-IFs that are a plurality of interfaces connected to the server device, and a second NW-IF that is an interface connected to at least one of a wireless base station and a network and that is an interface connected to any one of the plurality of first NW-IFs, the server device having a plurality of applications, each of which inputs and outputs data, a plurality of network namespaces, each of which is a basis for data transfer, and a plurality of server interfaces SV-IFs) that are a plurality of interfaces connected to respective ones of the plurality of first NW-IFs, each of the plurality of surfaces including a set of elements that includes an application of the plurality of applications, a network namespace of the plurality of network namespaces, an SV-IF of the plurality of SV-IFs, and a first NW-IF of the plurality of first NW-IFs, wherein, for each of the plurality of surfaces, no elements in the set of elements for the surface are used as elements of a surface other than the surface, the computer program comprising:
by the computer, selecting a surface conforming to conditions from the plurality of surfaces on a basis of surface management information including, for each of the plurality of surfaces, information related to the surface, and a namespace of the plurality of network namespaces being included in the surface, the surface having different network characteristics than the other surfaces; and
causing the network device to execute surface switching for connecting the second NW-IF to the first NW-IF of the plurality of first NW-IFs in the selected surface.

* * * * *